(12) United States Patent
Shimizu et al.

(10) Patent No.: US 10,484,264 B2
(45) Date of Patent: Nov. 19, 2019

(54) COMMUNICATION MANAGEMENT METHOD AND INFORMATION PROCESSING APPARATUS

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 15/451,744

(22) Filed: Mar. 7, 2017

(65) Prior Publication Data

US 2017/0272355 A1   Sep. 21, 2017

(30) Foreign Application Priority Data

Mar. 16, 2016   (JP) ................... 2016-052100

(51) Int. Cl.
| H04L 12/751 | (2013.01) |
| H04L 12/24 | (2006.01) |
| H04L 12/753 | (2013.01) |
| H04L 12/933 | (2013.01) |
| H04L 12/947 | (2013.01) |
| H04L 12/741 | (2013.01) |

(52) U.S. Cl.
CPC .............. *H04L 45/02* (2013.01); *H04L 41/12* (2013.01); *H04L 45/48* (2013.01); *H04L 49/1515* (2013.01); *H04L 49/1523* (2013.01); *H04L 49/25* (2013.01); *H04L 45/54* (2013.01)

(58) Field of Classification Search
CPC ................................ H04L 45/02; H04L 41/12
See application file for complete search history.

(56) References Cited

U.S. PATENT DOCUMENTS

| 8,175,107 B1* | 5/2012 | Yalagandula ....... H04L 45/7453 |
| | | 370/408 |
| 2009/0016332 A1* | 1/2009 | Aoki ..................... G06F 15/173 |
| | | 370/388 |
| 2012/0151090 A1* | 6/2012 | Nakashima ........... H04L 49/358 |
| | | 709/238 |

(Continued)

FOREIGN PATENT DOCUMENTS

| JP | 2013-25505 | 2/2013 |
| JP | 2014-164756 | 9/2014 |

OTHER PUBLICATIONS

Valerio et al., "Recursively Scalable Fat-Trees as Interconnection Networks", IEEE 13th Annual International Phoenix Conference on Computers and Communications, 1994. pp. 40-46.

*Primary Examiner* — Luat Phung
(74) *Attorney, Agent, or Firm* — Staas & Halsey LLP

(57) ABSTRACT

An information processing apparatus includes a memory; and a processor coupled to the memory and the processor configured to exclude a combination for satisfying a condition from multiple combinations each including a number of shifts of multiple switch layers in a fat-tree network using Latin square, create relay settings for multiple switches for performing communication through multiple communication paths corresponding to remain combinations except the combination excluded from the multiple combinations, and transmit correspondingly the created relay settings to the multiple switches.

8 Claims, 21 Drawing Sheets

(56) References Cited

U.S. PATENT DOCUMENTS

| | | | |
|---|---|---|---|
| 2012/0300669 A1* | 11/2012 | Zahavi | H04L 45/124 370/254 |
| 2013/0022047 A1* | 1/2013 | Nakashima | H04L 49/65 370/392 |
| 2014/0245324 A1 | 8/2014 | Minkenberg et al. | |

* cited by examiner

FIG. 6
RELATED ART

NUMBER OF
SHIFTS: 0

NUMBER OF
SHIFTS: 1

NUMBER OF
SHIFTS: 2

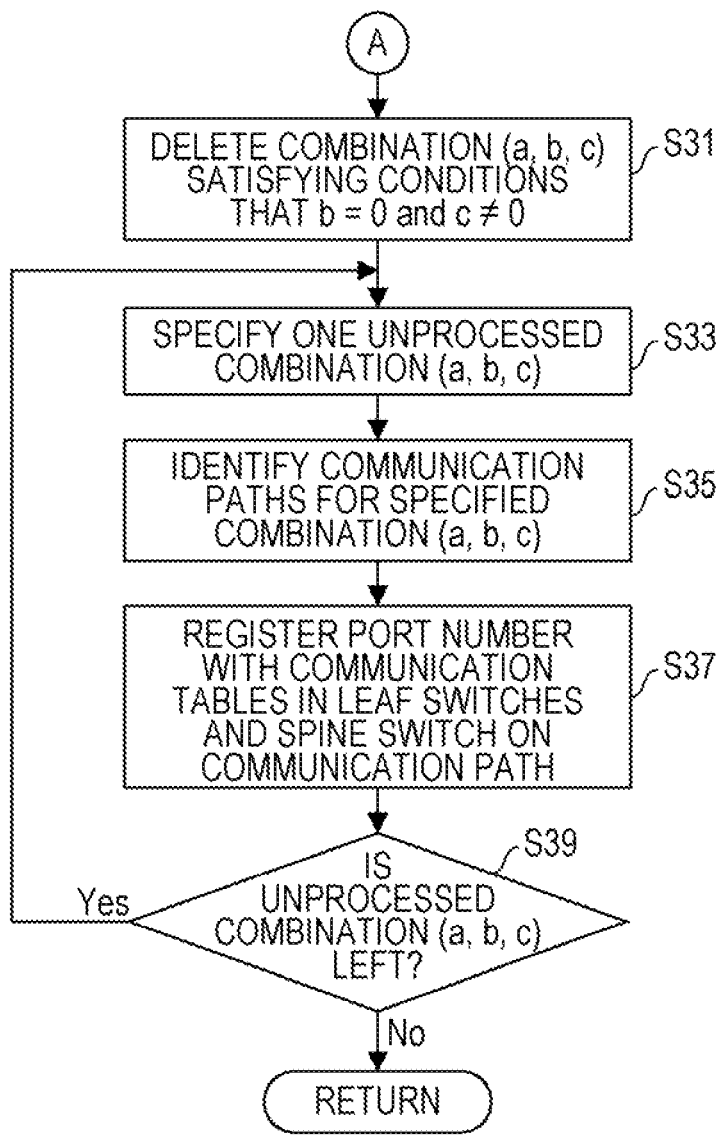

FIG. 18A

|  | DESTINATION | | | | | | | | |
|---|---|---|---|---|---|---|---|---|---|
| | 0 | 1 | 2 | 3 | 4 | 5 | 6 | 7 | 8 |
| 0 | 3 | 4 | 5 | 0 | 0 | 0 | 0 | 0 | 0 |
| 1 | 3 | 4 | 5 | 1 | 1 | 1 | 1 | 1 | 1 |
| 2 | 3 | 4 | 5 | 2 | 2 | 2 | 2 | 2 | 2 |
| 3 | 3 | 4 | 5 | - | - | - | - | - | - |
| 4 | 3 | 4 | 5 | - | - | - | - | - | - |
| 5 | 3 | 4 | 5 | - | - | - | - | - | - |
| 6 | 3 | 4 | 5 | - | - | - | - | - | - |
| 7 | 3 | 4 | 5 | - | - | - | - | - | - |
| 8 | 3 | 4 | 5 | - | - | - | - | - | - |

SOURCE (row label), OUTPUT PORT (columns)

COMMUNICATION MANAGEMENT METHOD AND INFORMATION PROCESSING APPARATUS

CROSS-REFERENCE TO RELATED APPLICATION

This application is based upon and claims the benefit of priority of the prior Japanese Patent Application No. 2016-052100, filed on Mar. 16, 2016, the entire contents of which are incorporated herein by reference.

FIELD

The embodiment discussed herein is related to a collective communication technique.

BACKGROUND

There has been known a Latin square fat-tree network as a network that connects multiple nodes (physical servers, for example) configured to perform collective communication. The Latin square fat-tree network is capable of connecting a larger quantity of nodes than an ordinary fat-tree network.

FIG. 1 illustrates an example of a Latin square fat-tree network. In the example of FIG. 1, a circle figure represents a node, a hatched square figure represents a spine switch, and an unhatched square figure represents a leaf switch. The quantity of ports on each switch is 6, and the number n, obtained by dividing the quantity of ports by 2, and then subtracting 1 from the resultant number, is 2. This number corresponds to the order of a finite projective plane. The quantity of nodes connected to the leaf switches is 21.

FIG. 2 illustrates an ordinary fat-tree network using the same switches as used in FIG. 1. In the example of FIG. 2, the quantity of nodes connected to the leaf switches is 9, which is smaller than in the example of FIG. 1.

FIG. 3 illustrates another example of a Latin square fat-tree network. In the example of FIG. 3, the number of ports on each switch is 8, and the number n is 3. The number of nodes connected to the leaf switches is 52.

FIG. 4 illustrates an ordinary fat-tree network using the same switches as used in FIG. 3. In the example of FIG. 4, the number of nodes connected to the leaf switches is 16, which is smaller than in the example of FIG. 3.

There has been known a technique for an ordinary fat-tree network to perform all-to-all communication (all-to-all communication is a kind of collective communication) in which all nodes participate. However, there has not been known a technique for a Latin square fat-tree network to perform all-to-all communication in which all nodes participate.

The related techniques are described in, for example, Japanese Laid-open Patent Publication Nos. 2014-164756 and 2013-25505, as well as M. Valerio, L. E. Moser and P. M. Melliar-Smith, "Recursively Scalable Fat-Trees as Interconnection Networks", IEEE 13th Annual International Phoenix Conference on Computers and Communications, 1994.

SUMMARY

According to an aspect of the invention, an information processing apparatus includes a memory; and a processor coupled to the memory and the processor configured to exclude a combination for satisfying a condition from multiple combinations each including a number of shifts of multiple switch layers in a fat-tree network using Latin square, create relay settings for multiple switches for performing communication through multiple communication paths corresponding to remain combinations except the combination excluded from the multiple combinations, and transmit the created relay settings to the multiple switches.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram for explaining the all-to-all communication in the fat-tree network;
FIG. 17 is a diagram illustrating a procedure of the creation processing;
FIG. 18A is a diagram illustrating an example of a communication table.

DESCRIPTION OF EMBODIMENT

Figure 1:
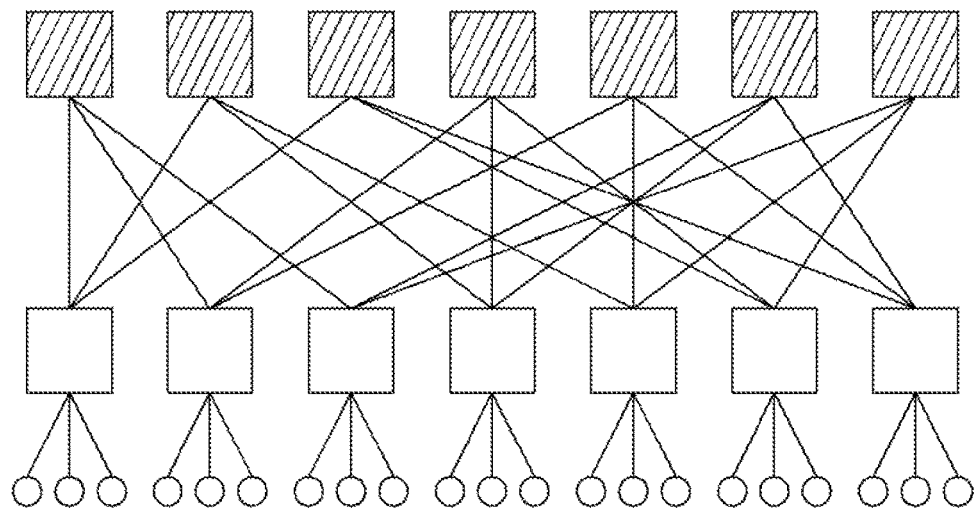
FIG. 1 is a diagram illustrating an example of a Latin square fat-tree network.
Figure 2:
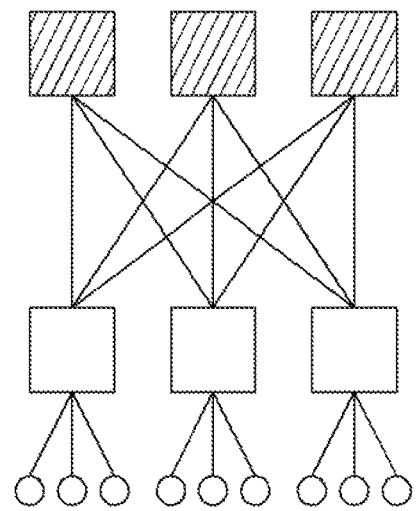
FIG. 2 is a diagram illustrating an example of a fat-tree network.
Figure 3:
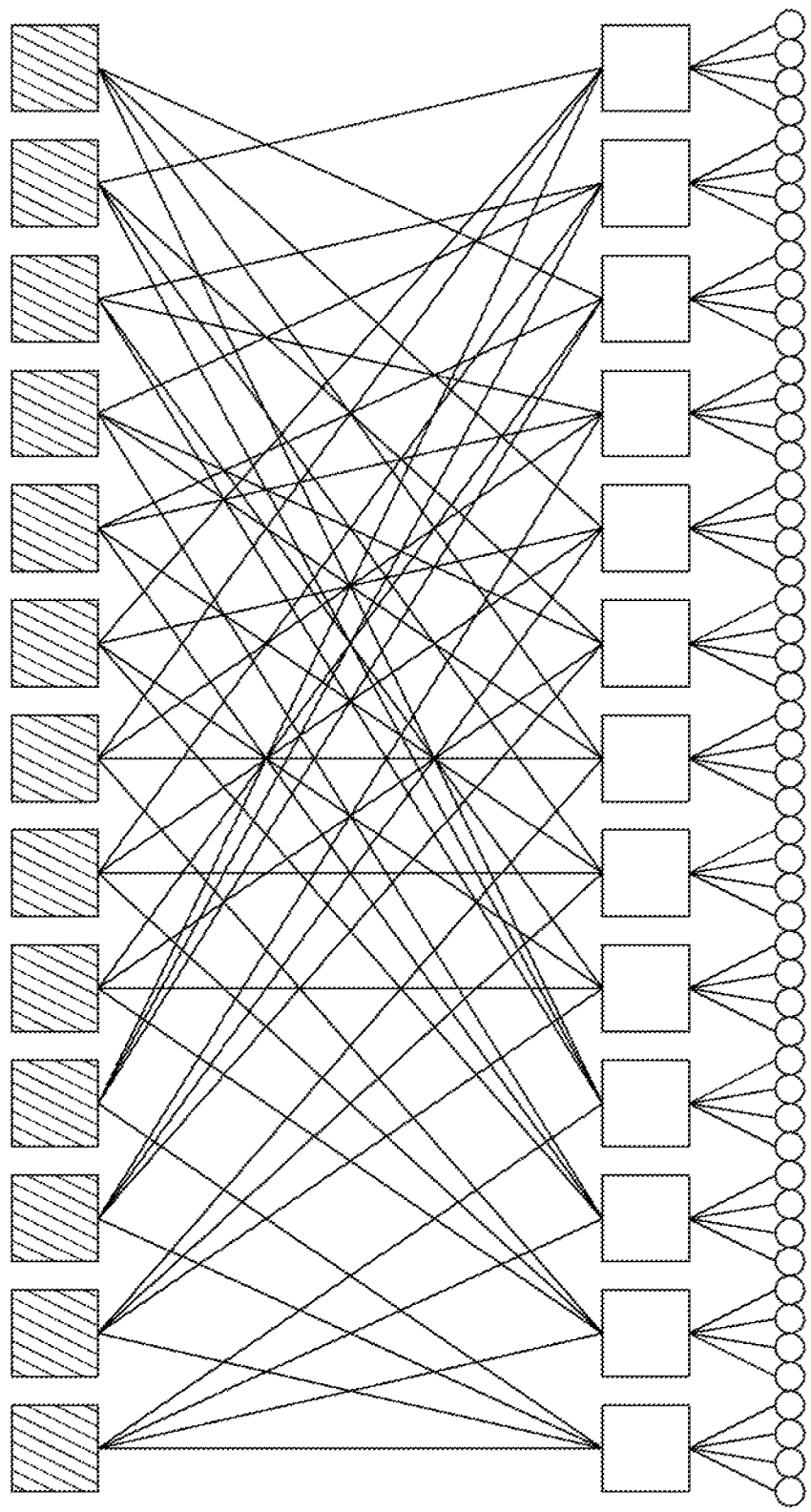
FIG. 3 is a diagram illustrating an example of a Latin square fat-tree network.
Figure 4:
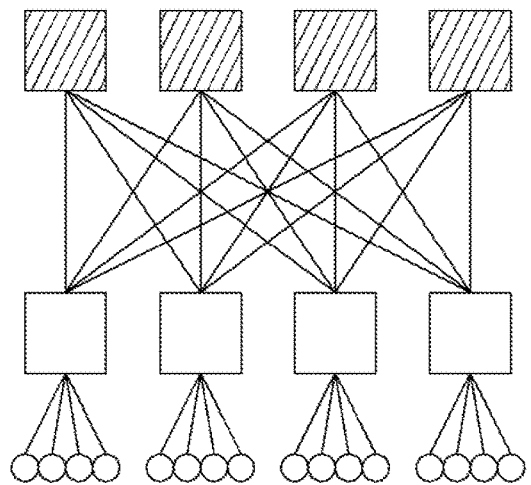
FIG. 4 is a diagram illustrating an example of a fat-tree network.
Figure 5:
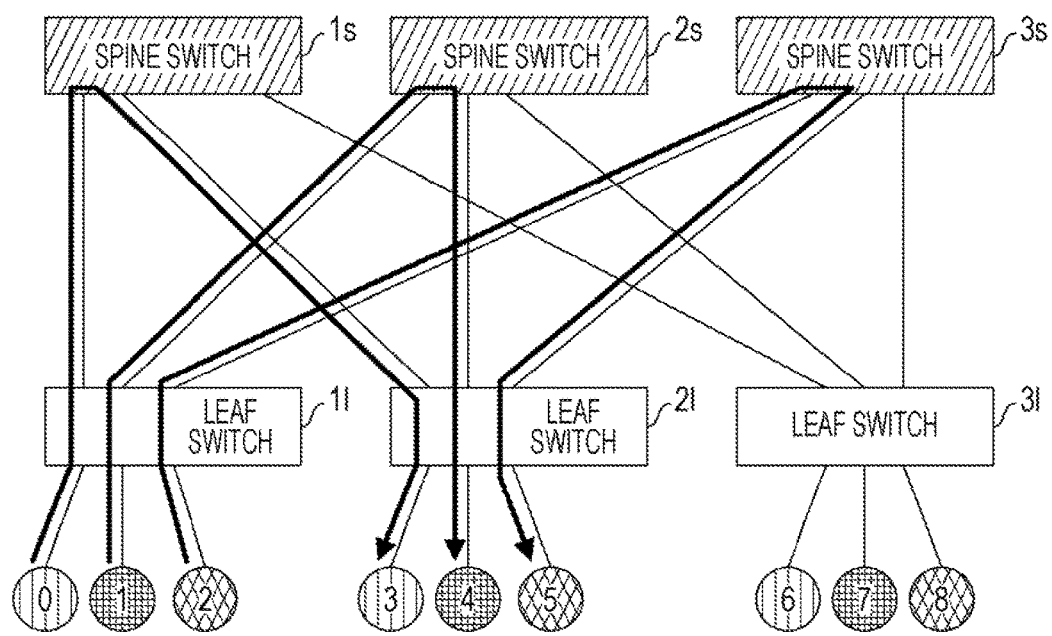
FIG. 5 is a diagram for explaining all-to-all communication in a fat-tree network.

All-to-all communication is communication in which each node transmits data to all nodes, and is performed in phases the number of which is the same as the number of nodes. Consider the case where all-to-all communication is performed in the fat-tree network illustrated in FIG. 5, for example. In FIG. 5, nodes 0 to 2 are connected to a leaf switch 11, nodes 3 to 5 are connected to a leaf switch 21, and nodes 6 to 8 are connected to a leaf switch 31. Each of the leaf switches 11 to 31 is connected to spine switches 1s to 3s.

Figure 6:
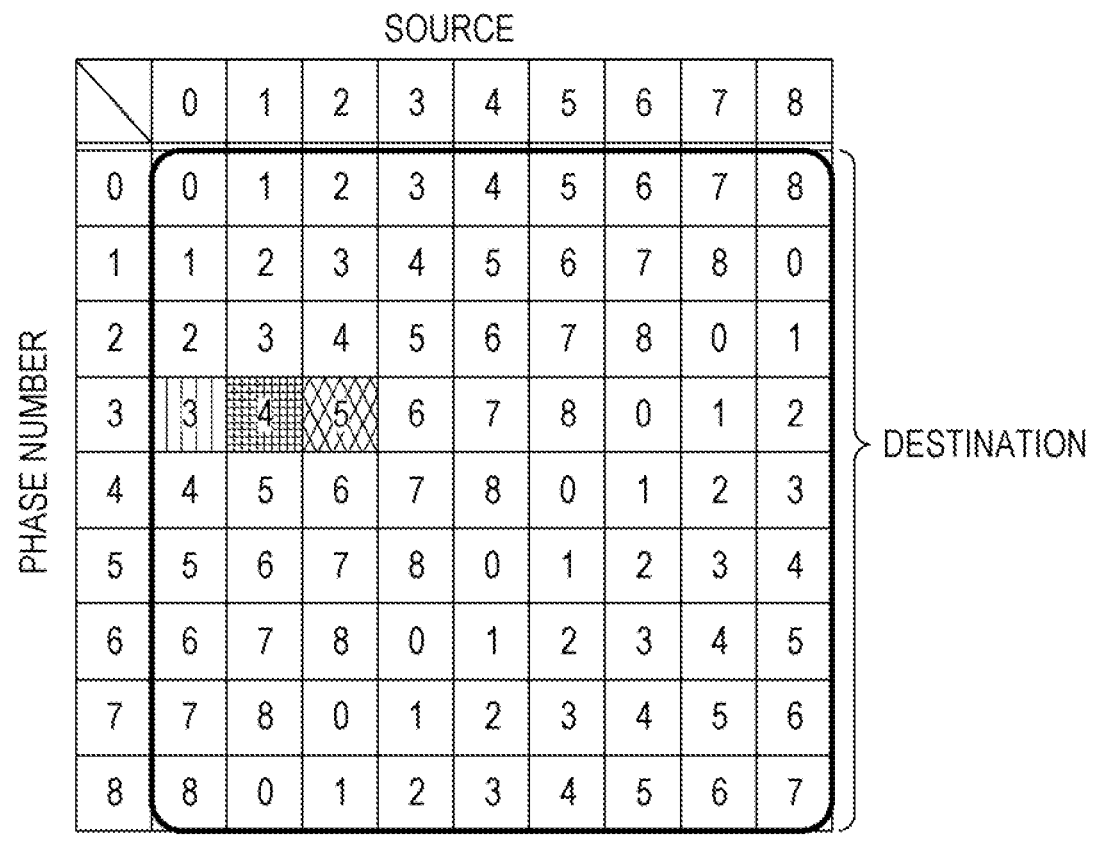

In the fat-tree network illustrated in FIG. 5, it is possible to avoid contention of communication by performing all-to-all communication in accordance with shift communication patterns illustrated in FIG. 6. FIG. 6 indicates destination node numbers, each corresponding to each combination of a source node number and a phase number. A node k transmits a packet to a node (k+i) % N in an i-th phase. Here, N is the number of nodes, and % is an operator to obtain the remainder. Hatched Blocks in FIG. 6 correspond to communications indicated by bold lines in FIG. 5.

As illustrated in FIG. 6, every number from 0 to 8 appears in each row and each column. In a fat-tree network, in the case where a network is taken out by a leaf switch, it is possible to perform communication without contention.

Figure 7:
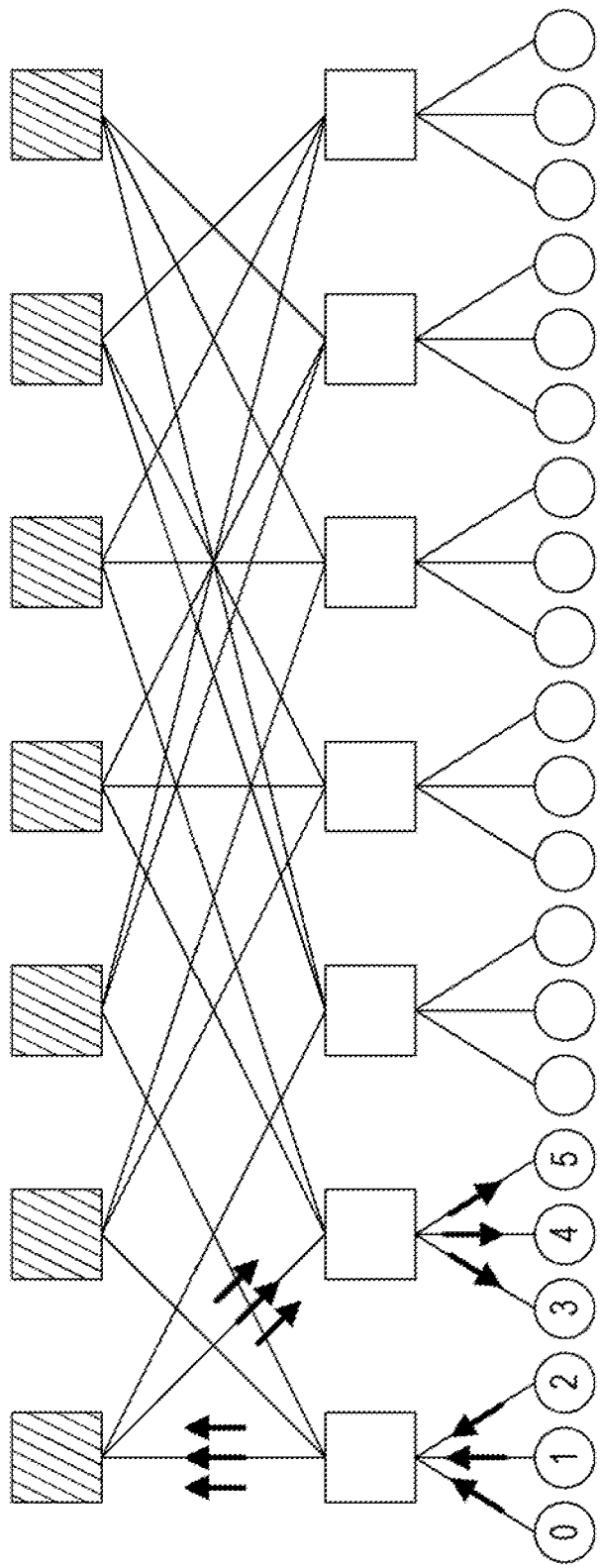
FIG. 7 is a diagram for explaining contention of communication.

However, the shift communication patterns illustrated in FIG. 6 are not applicable to a Latin square fat-tree network (a fat-tree network using Latin square). For example, consider the case where nodes 0 to 2 transmit a packet to nodes 3 to 5 in a phase as illustrated in FIG. 7. In this case, because there is only one communication path passing through a spine switch between a leaf switch immediately above the nodes 0 to 2 and a leaf switch immediately above the nodes 3 to 5, the contention occurs on the communication path from the leaf switch immediately above the nodes 0 to 2 to the spine switch immediately above the nodes 0 to 2, and on the communication path from the spine switch immediately above the nodes 0 to 2 to the leaf switch immediately above the nodes 3 to 5. Contention leads to communication delay, which in turn causes degradation in processing performance of a parallel computer, or other problems.

Figure 8A:
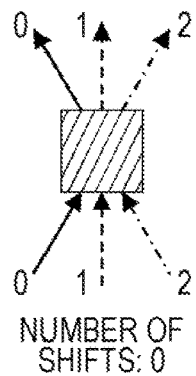
FIGS. 8A to 8C are diagrams for explaining the number of shifts.
Figure 8B:
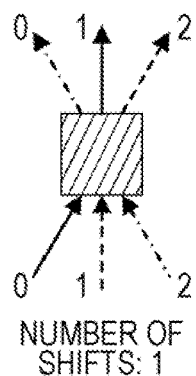
Figure 8C:
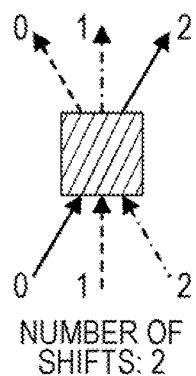

Note that it is conceivable to think of performing communication by setting the number of shifts in the shift communication patterns for every layer. Descriptions are provided for the number of shifts using FIGS. 8A to 8C. FIG. 8A illustrates packet relays when the number of shifts is 0, FIG. 8B illustrates packet relays when the number of shifts is 1, and FIG. 8C illustrates packet relays when the number of shifts is 2. An arrow represents a link, and a number attached to the arrow indicates the port number. For example, a packet received from a port number i is outputted at a port with a port number (i+s) % M (where s is the number of shifts, and M is the number of ports). Accordingly, when the number of shifts is 0, a packet received from a reception port 0 is outputted at a transmission port 0, a packet received from a reception port 1 is outputted at a transmission port 1, and a packet received from a reception port 2 is outputted at a transmission port 2. When the number of shifts is 1, a packet received from the reception port 0 is outputted at the transmission port 1, a packet received from the reception port 1 is outputted at the transmission port 2, and a packet received from the reception port 2 is outputted at the transmission port 0. When the number of shifts is 2, a packet received from the reception port 0 is outputted at the transmission port 2, a packet received from the reception port 1 is outputted at the transmission port 0, and a packet received from the reception port 2 is outputted at the transmission port 1.

Figure 9:
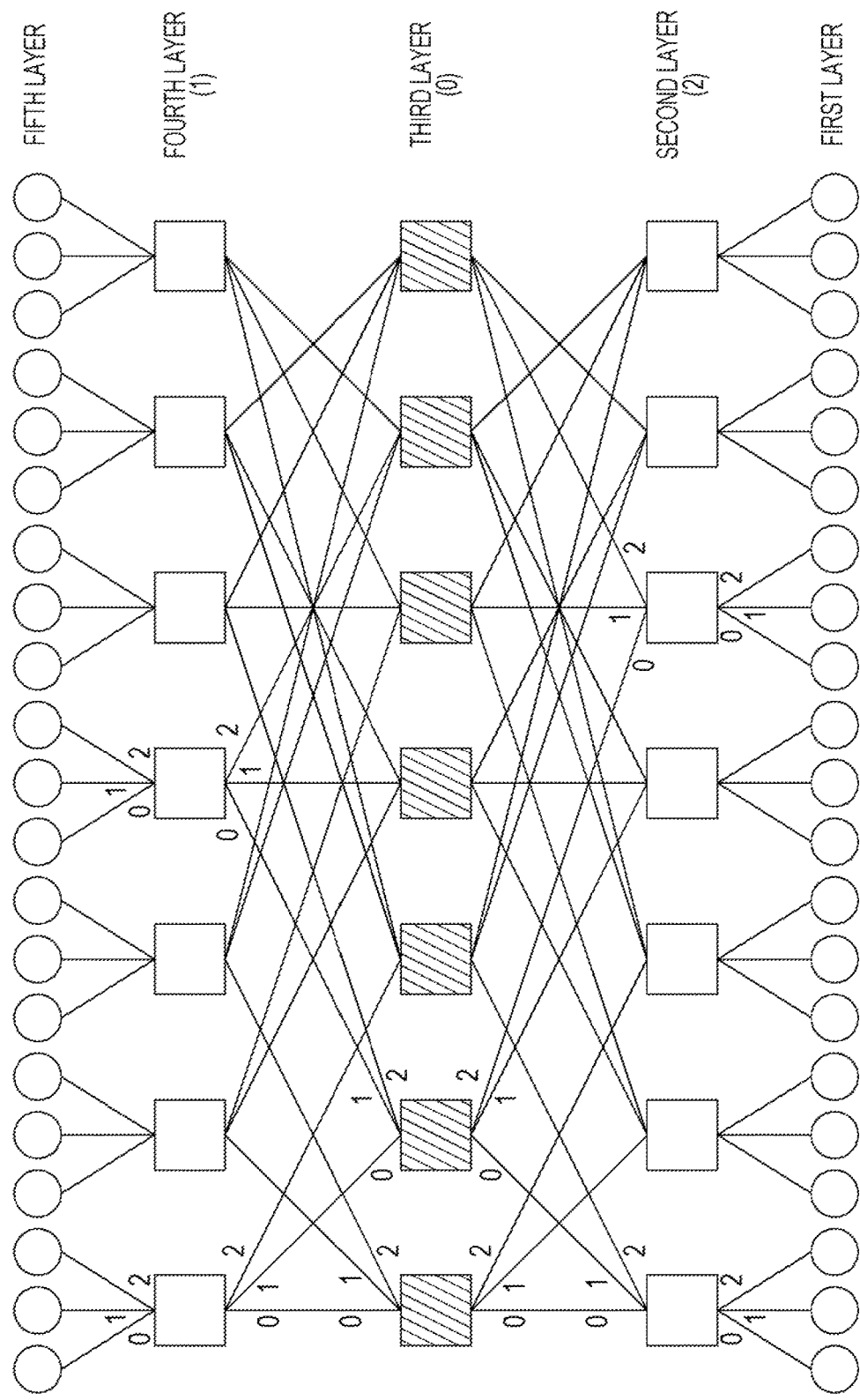
FIG. 9 is a diagram illustrating the number of shifts of each switch layer in a Latin square fat-tree network.

As an example, consider the case of changing the number of shifts in each switch layer (second to fourth layers in FIG. 9) in a Latin square fat-tree network illustrated in FIG. 9. A number attached to a link connected to a switch indicates a port number to which the link is connected. In this example, the number of shifts in the second layer is 2, the number of shifts in the third layer is 0, and the number of shifts in the fourth layer is 1.

Figure 10:
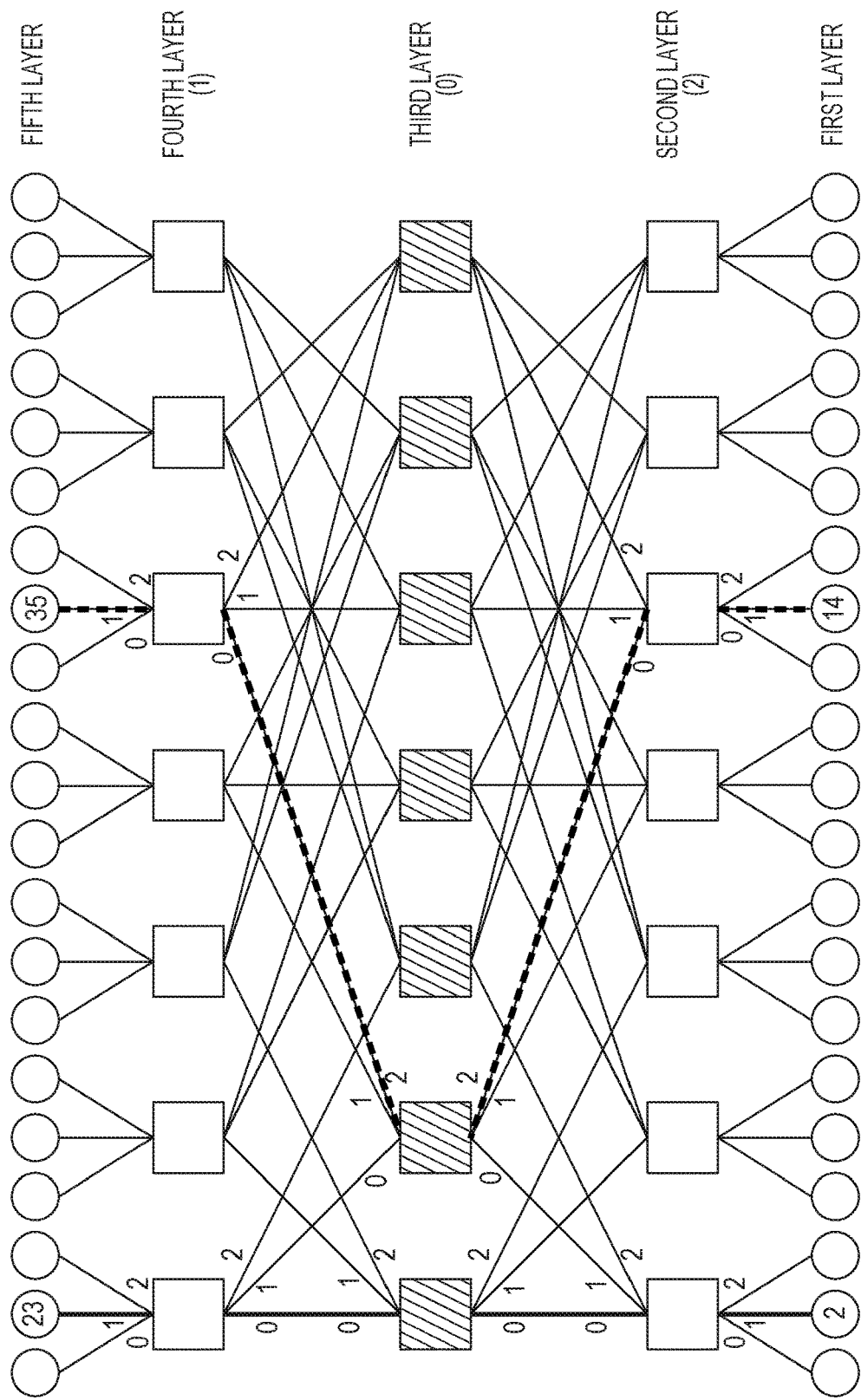
FIG. 10 is a diagram for explaining packet transfer in the Latin square fat-tree network.

Then, for example as illustrated in FIG. 10, consider the case of transferring a packet from a node belonging to a first layer to a node belonging to a fifth layer. In the example of FIG. 10, a packet transmitted by a node 2 is transferred to a node 23, and a packet transmitted by a node 14 is transferred to a node 35. In FIG. 10, the links indicated by the bold solid lines represent a communication path from the node 2 to the node 23, and the links indicated by the broken lines represent a communication path from the node 14 to the node 35.

Figure 11:
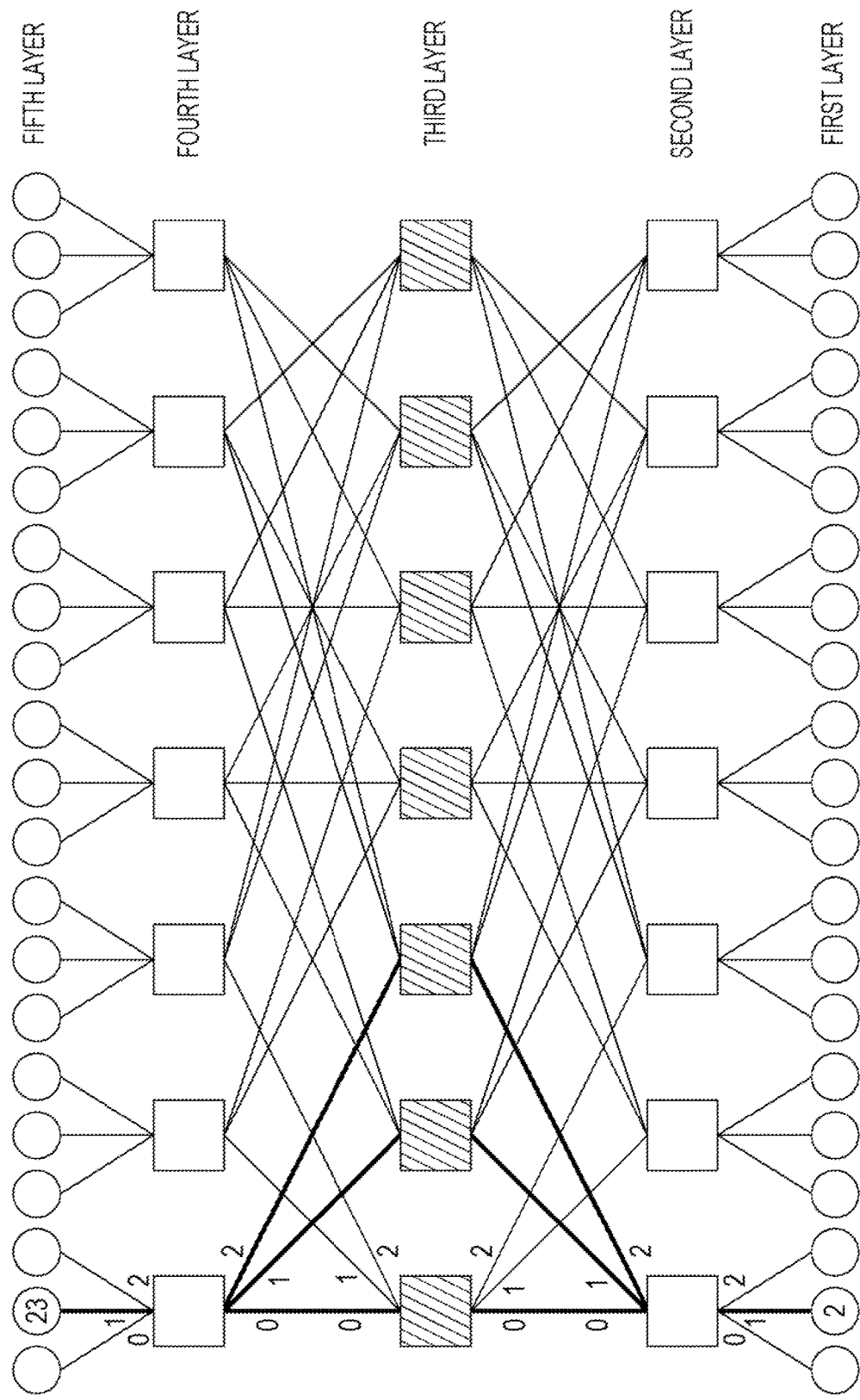
FIG. 11 is a diagram for explaining packet transfer in the Latin square fat-tree network.

There is only one communication path from the node 14 to the node 35. On the other hand, there are three communication paths from the node 2 to the node 23, as illustrated in FIG. 11. This is because there are three communication paths between a leaf switch connected to the node 2 and a leaf switch connected to the node 23.

As described above, in the case where communication is performed by setting the number of shifts in the shift communication patterns for every layer, there may be multiple communication paths from a source node to a destination node depending on the positional relationship between the source node and the destination node, which may cause redundant communication. Hence in this embodiment, descriptions are provided for a method of performing all-to-all communication in a Latin square fat-tree network, in which all nodes participate without causing redundant communication.

Assume that a system in this embodiment is a Latin square fat-tree network system as illustrated in FIG. 9, for example. Note that port numbers are attached following the rules below.

(1) Port numbers 0, 1, 2, and so on are attached to the lower links and the upper links of each switch. (2) In the third layer, the port numbers of the upper links agree with the port numbers of the lower links. (3) In the second and fourth layers, the port numbers of the upper links does not have to agree with the port numbers of the lower links.

Figure 12:
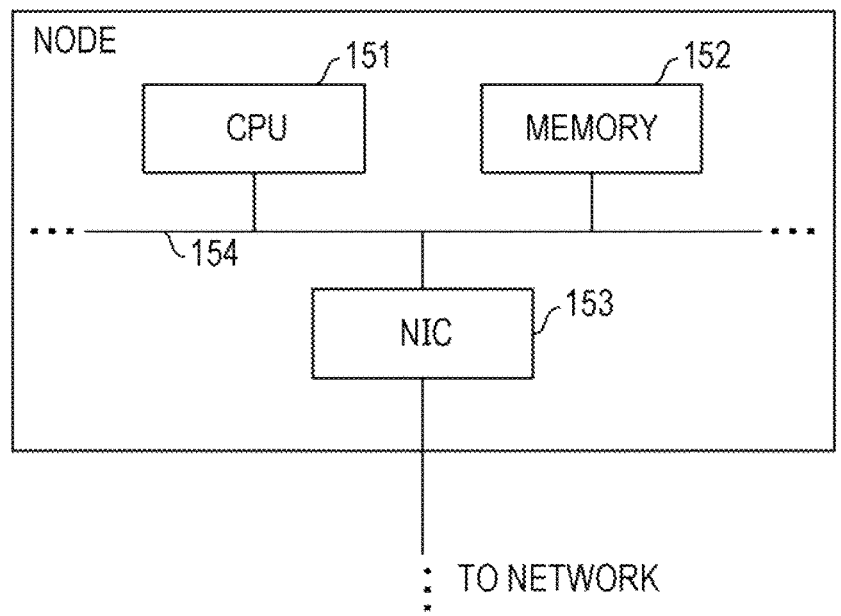
FIG. 12 is a hardware configuration diagram of a node.

FIG. 12 illustrates a hardware configuration diagram of a node according to this embodiment. The node includes a central processing unit (CPU) 151, a memory 152, a network interface card (NIC) 153, and a bus 154. The CPU is also called a processor. The CPU 151, the memory 152, and the NIC 153 are connected by the bus 154. The NIC 153 is connected to other nodes with InfiniBand, for example, and communicates with the other nodes.

Figure 13:
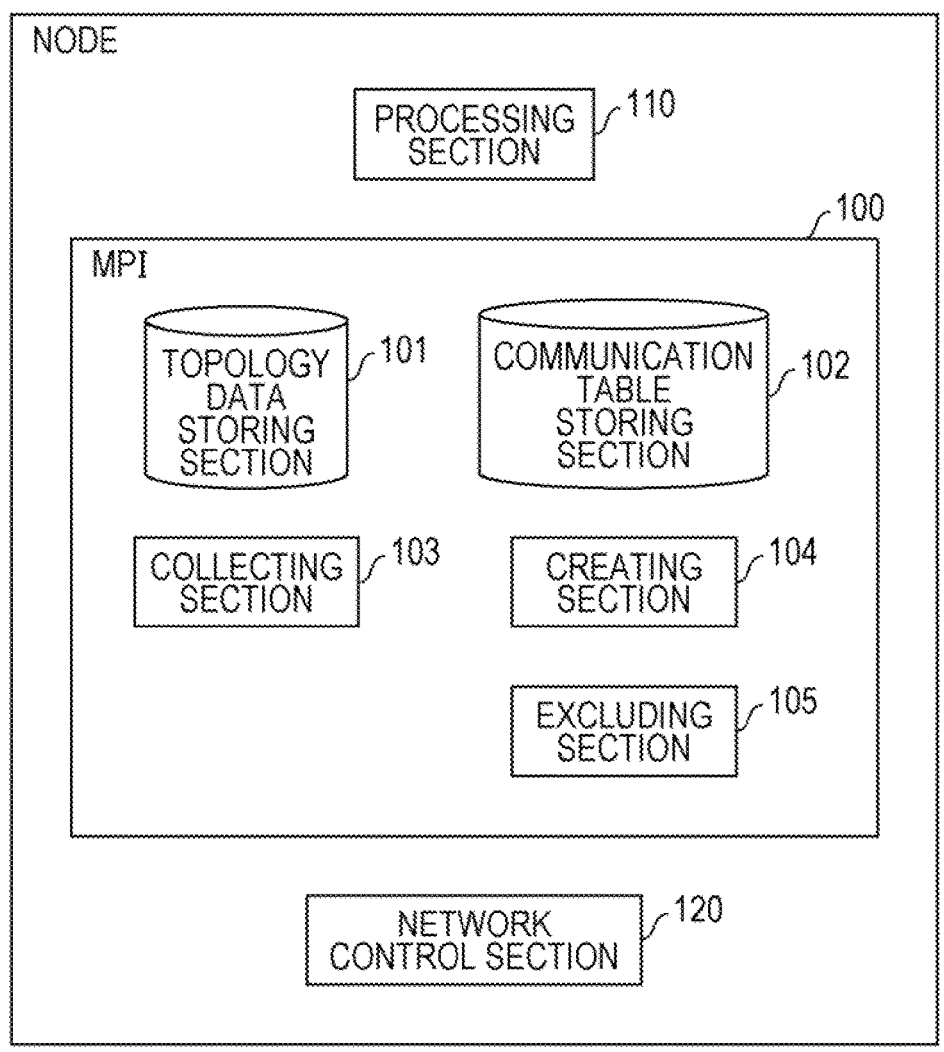
FIG. 13 is a functional block diagram of the node.

FIG. 13 illustrates a functional block diagram of the node in this embodiment. The node includes a processing section 110, a message passing interface (MPI) 100, and a network control section 120. The MPI 100 includes a topology data storing section 101, a communication table storing section 102, a collecting section 103, a creating section 104, and an excluding section 105. The processing section 110 is implemented by CPU 151 executing an application program, which is loaded into the memory 152. The MPI 100 is implemented by CPU 151 executing MPI libraries, which are loaded into the memory 152. The network control section 120 is implemented by CPU 151 executing network drivers, which are loaded into the memory 152.

The processing section 110 communicates with processing sections 110 of other nodes via MPI 100 while advancing processing. The network control section 120 executes processing to control the NIC 153 or other processing. The collecting section 103 collects data on the topology of the Latin square fat-tree network (for example, data on connection relation of switches, data on connection relation between switches and nodes, and the like), and stores the thus-collected data in the topology data storing section 101. The creating section 104 creates a communication table, which is a relay setting that the switches use to relay packets, based on the data stored in the topology data storing section 101, and stores the communication table in the communication table storing section 102. The excluding section 105, in response to a call from the creating section 104, executes processing to exclude combinations that satisfy a condition.

Figure 14:
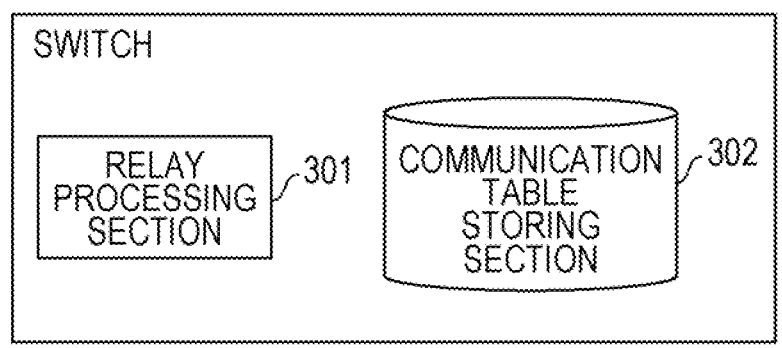
FIG. 14 is a functional block diagram of a switch.

FIG. 14 illustrates a functional block diagram of a switch in this embodiment. The switch includes a relay processing section 301 and a communication table storing section 302. The relay processing section 301 executes processing to relay a packet according to the communication table stored in the communication table storing section 302.

Next, descriptions are provided for processing executed in the Latin square fat-tree network of this embodiment using FIGS. 15 to 22. First, descriptions are provided for processing performed by a node in the Latin square fat-tree network using FIGS. 15 to 17. Here, the node performing this processing is called a node ND.

The collecting section 103 in the node ND collects data on the topology of the Latin square fat-tree network (step S1 in FIG. 15) by executing a prescribed command (for example, ibnetdiscover), and stores the collected data in the topology data storing section 101.

The creating section 104 in the node ND executes creation processing using the data stored in the topology data storing section 101 (step S3). The creation processing is described using FIGS. 16 and 17. Assume that a blank communication table is initially stored in the communication table storing section 102, as for each switch.

First, the creating section 104 sets a, which is the number of shifts of the second layer, to 0 (step S11 in FIG. 16); b, which is the number of shifts of the third layer, to 0 (step S13); and c, which is the number of shifts of the fourth layer, to 0 (step S15). The numbers a, b, and c are integers satisfying $0 \leq a, b, c \leq n$. The number n is a number obtained by dividing the number of ports of a switch (6 in the example in FIG. 9) by 2, and subtracting 1 from the resultant value (2 in the example in FIG. 9).

The creating section 104 registers combinations (a, b, c) with the memory 152 (step S17), and increments c by 1 (step S19).

The creating section 104 determines whether c>n holds (step S21). If c>n does not hold (No route at step S21), the process returns to the processing at step S17. On the other hand, if c>n holds (Yes route at step S21), the creating section 104 increment b by 1 (step S23).

The creating section 104 determines whether b>n holds (step S25). If b>n does not hold (No route at step S25), the process returns to the processing at step S15. On the other hand, if b>n holds (Yes route at step S25), the creating section 104 increments a by 1 (step S27).

The creating section 104 determines whether a>n holds (step S29). If a>n does not hold (No route at step S29), the process returns to the processing at step S13. If a>n holds (Yes route at step S29), the creating section 104 advances the process to processing of step S31 in FIG. 17 via terminal A.

Moving to descriptions for FIG. 17, the creating section 104 calls out the excluding section 105. Then, out of the combinations (a, b, c) registered at step S17, the excluding section 105 deletes the combinations (a, b, c) satisfying the conditions that b=0 and c≠0, from the memory 152 (step S31 in FIG. 17).

After completing the processing up to step S31, the following combinations (a, b, c) are registered in the memory 152.

(a, b, c) $1 \leq b \leq n$, $0 \leq a$, $c \leq n$
(a, 0, 0) $0 \leq a \leq n$

In the case where n=2, for example, the combinations registered in the memory 152 are (0,0,0), (0,1,0), (0,1,1), (0,1,2), (0,2,0), (0,2,1), (0,2,2), (1,0,0), (1,1,0), (1,1,1), (1,1,2), (1,2,0), (1,2,1), (1,2,2), (2,0,0), (2,1,0), (2,1,1), (2,1,2), (2,2,0), (2,2,1), and (2,2,2). The number of the combinations is $n(n+1)^2+(n+1)=(n+1)(n(n+1)+1)=(n+1)(n^2+n+1)=21$. This number is the same as a half of the number of nodes in FIG. 9. On the other hand, the combinations excluded at step S31 are (0,0,1), (0,0,2), (1,0,1), (1,0,2), (2,0,1), and (2,0,2).

The creating section 104 specifies one unprocessed combination (a, b, c) out of the combinations (a, b, c) registered in the memory 152 (step S33).

The creating section 104 identifies communication paths for the combination (a, b, c) specified at step S33 (step S35). At step S35, the source node, the leaf switch connected to the source node, the spine switch, the leaf switch connected to the destination node, and the destination node, which are on each of the communication paths, are identified based on the data stored in the topology data storing section 101.

The creating section 104 registers the port numbers of the ports to create the communication path with the communication tables of the leaf switches and the spine switch on the communication path identified at step S35 (step S37). For example, in the case where the spine switch on the communication path transmits a packet from a port number "X" of the spine switch to a leaf switch on the communication path, the port number "X" is registered being associated with the combination of the source node number and the destination node number.

The creating section 104 determines whether an unprocessed combination (a, b, c) is left, out of the combinations (a, b, c) registered with the memory 152 (step S39). If an unprocessed combination is left (Yes route at step S39), the process returns to the processing at step S33. On the other hand, if there is no unprocessed combination left (No route at step S39), the process returns to the processing of the caller.

Figure 18B:
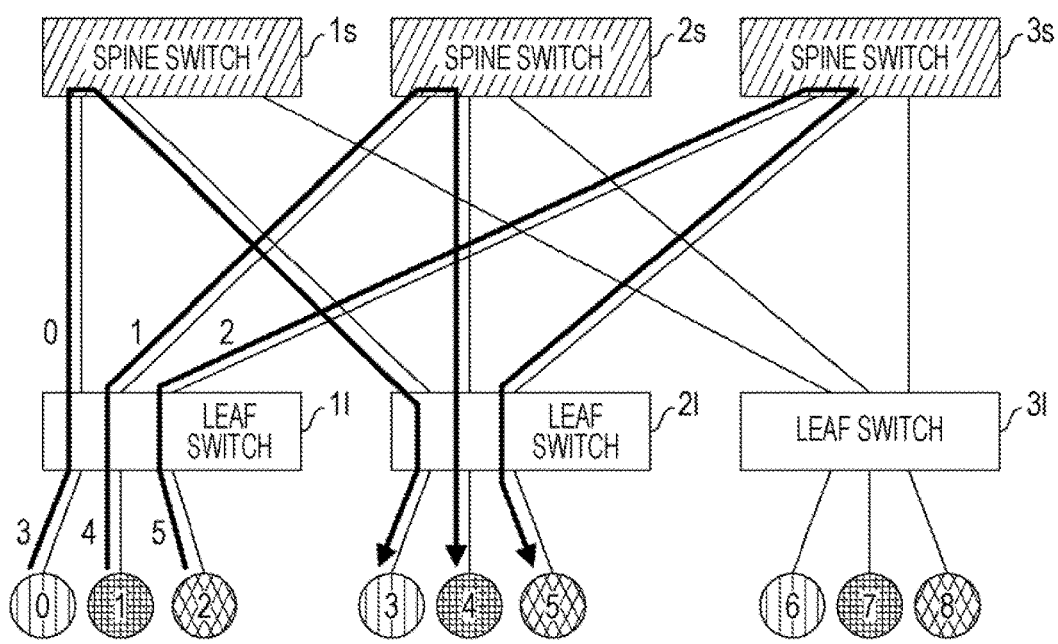
FIG. 18B is a diagram illustrating an example of communication.

FIG. 18A illustrates an example of a communication table created in the creation processing. The example of FIG. 18A illustrates an example of a communication table created for a leaf switch connected to nodes 0 to 1 in a network illustrated in FIG. 18B. For the portions where relays of the leaf switch are not related, symbols "-" are registered. The communications corresponding to the hatched portions in FIG. 18A correspond to the communications indicated by the bold lines in FIG. 18B. Note that although the network in FIG. 18B is not a Latin square fat-tree network, the processing in this embodiment is applicable to ordinary fat-tree networks as well as Latin square fat-tree networks.

Figure 15:
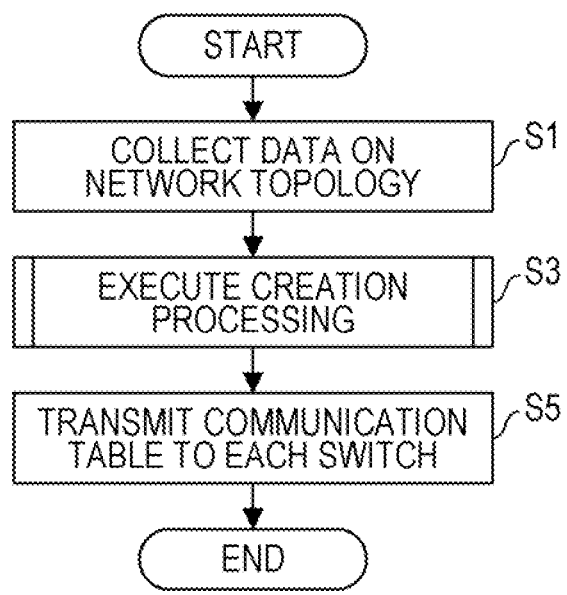
FIG. 15 is a diagram illustrating a procedure of processing executed by the node.

Returning to the descriptions for FIG. 15, the network control section 120 in the node ND reads out the communication tables each created for the switches in the Latin square fat-tree network, from the communication table storing section 102. Then, the network control section 120 transmits to each switch the communication table to be applied to the switch (step S5). After that, the process ends.

The processing above enables each switch to obtain the communication table to be applied to the switch.

Figure 19:
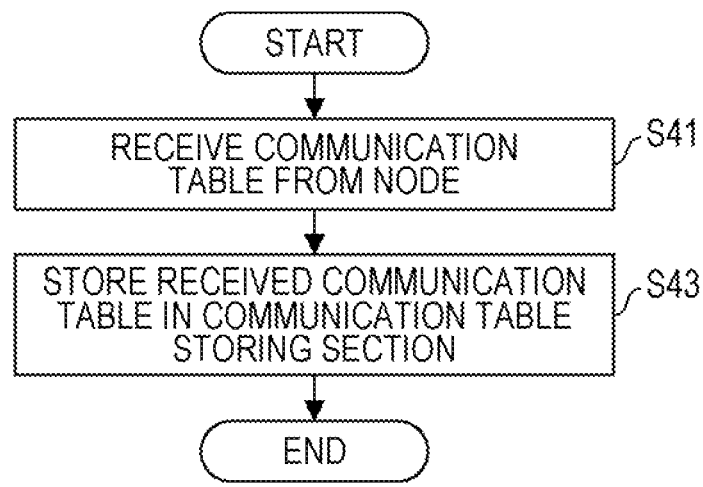
FIG. 19 is a diagram illustrating a procedure of processing executed by the switch.
Figure 20:
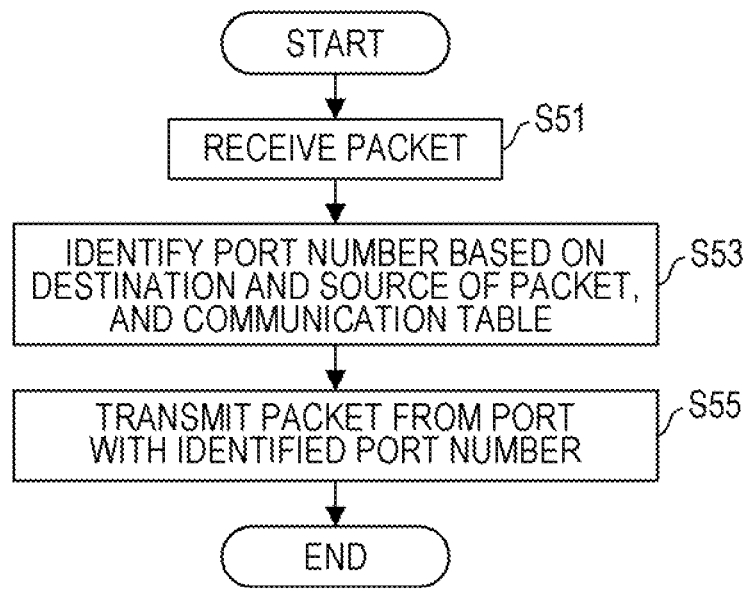
FIG. 20 is a diagram illustrating a procedure of processing executed by the switch.

Next, descriptions are provided for the processing executed by each switch in the Latin square fat-tree network using FIGS. 19 and 20. Here, a switch executing this processing is called a switch SW.

First, the relay processing section 301 in the switch SW receives a communication table to be applied to the switch SW from the node that created the communication table (step S41 in FIG. 19).

The relay processing section 301 stores the communication table received at step S41 in the communication table storing section 302 (step S43). Then, the process ends.

When the switch SW receives a packet, the following processing is executed.

The relay processing section 301 in the switch SW receives a packet from a node or another switch (step S51 in FIG. 20).

The relay processing section 301 identifies, from the packet, information indicating the destination of the packet (a node number in this embodiment) and information indicating the source of the packet (a node number in this embodiment). Then, the relay processing section 301 identifies the port number corresponding to the combination of the destination and the source of the packet from the communication table stored in the communication table storing section 302 (step S53). For example, the communication table illustrated in FIG. 18A is stored in the communication table storing section 302.

The relay processing section 301 transmits the packet received at step S51 from the port with the port number identified at step S53 (step S55). Then, the process ends.

The processing described above enables each switch to perform relays according to the relay setting that causes no redundant communication. This makes it possible to perform all-to-all communication in which all nodes participate without causing redundant communication in a Latin square fat-tree network.

Figure 21:
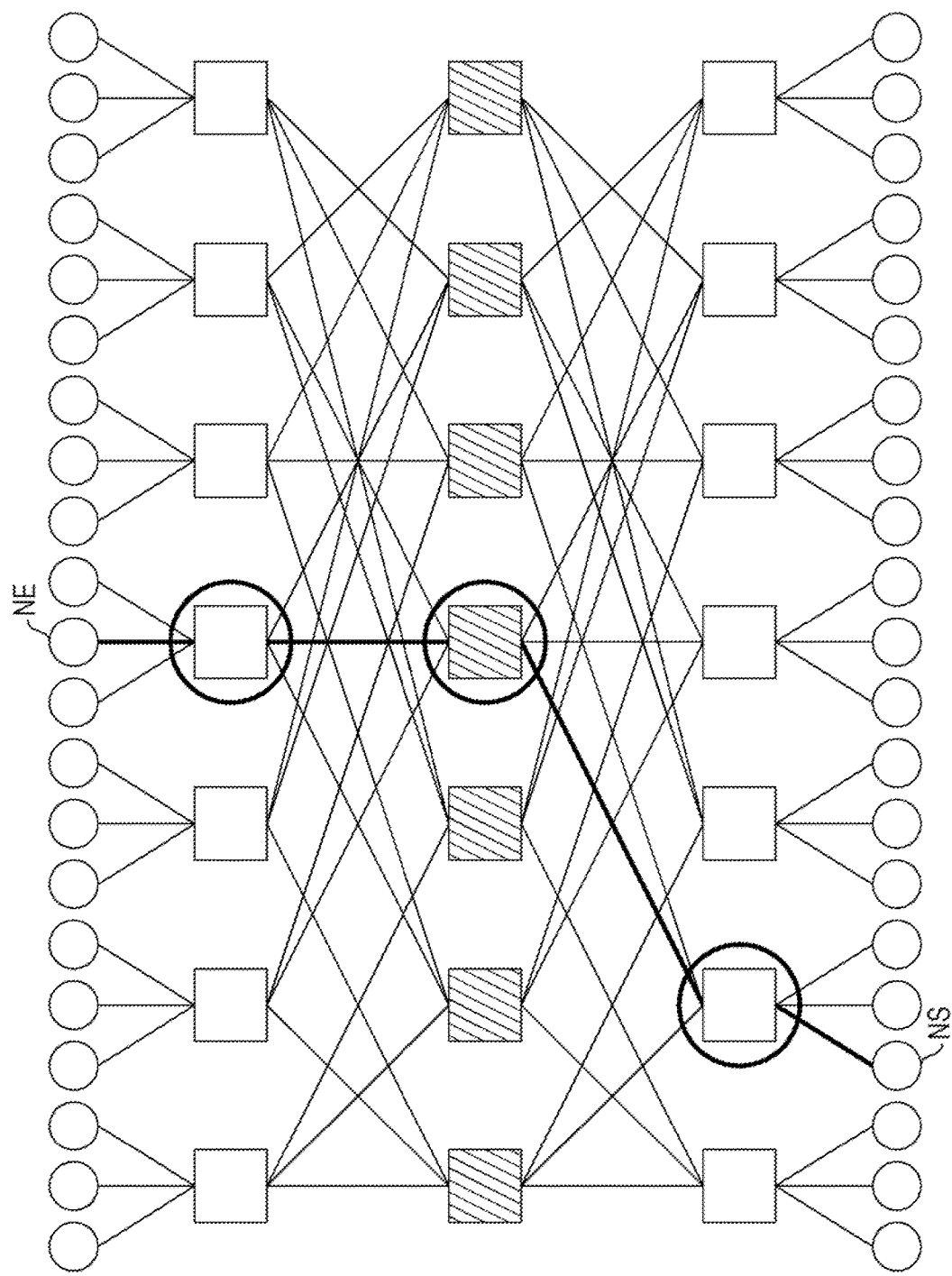
FIG. 21 is a diagram for explaining that no contention occurs.
Figure 22:
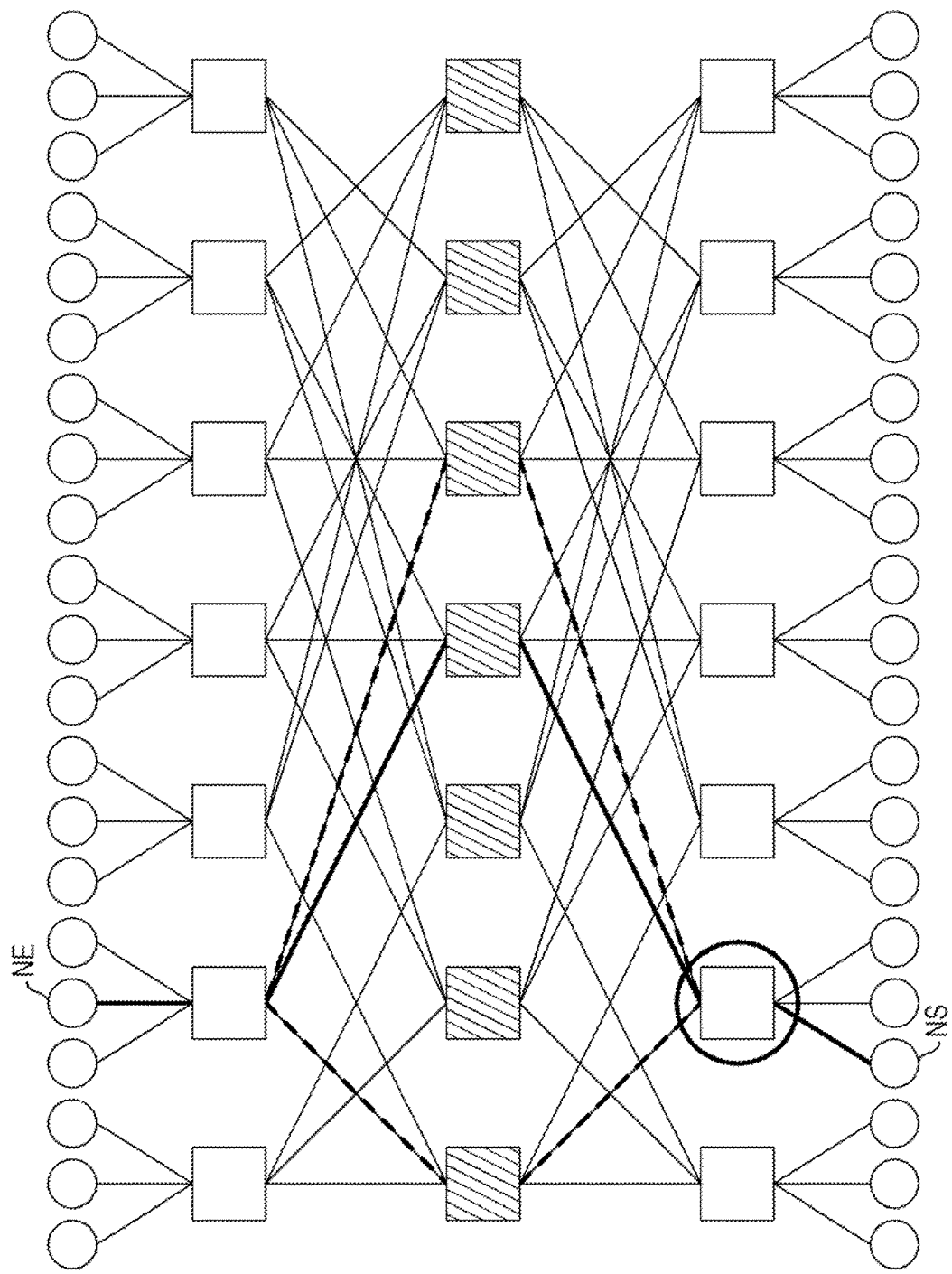
FIG. 22 is a diagram for explaining that no contention occurs.

Next, using FIGS. 21 and 22, it is proved that all-to-all communication is possible without causing any contention.

First, assume a communication path for sending a packet from a node NS to a node NE, which are positioned as illustrated in FIG. 21. In the example of FIG. 21, the leaf switch immediately above the node NS and the leaf switch immediately above the node NE are not positioned symmetrically with respect to the axis as which the layer of the spine switches is regarded. In such a case, because only one communication path exists between the two nodes, only one combination (a, b, c) corresponding to the communication path is determined. Since the leaf switch immediately above the node NS and the leaf switch immediately above the node NE are not positioned symmetrically with respect to the axis as which the layer of the spine switches is regarded, the combination (a, b, c) is determined, particularly by setting $b \neq 0$.

Meanwhile, assume a communication path for sending a packet from a node NS to a node NE positioned as illustrated in FIG. 22. In the example of FIG. 22, the leaf switch immediately above the node NS and the leaf switch immediately above the node NE are positioned symmetrically with respect to the axis as which the layer of the spine switches is regarded. In this case, although three communication paths exist between the node NS and the node NE, only one communication path (the communication path indicated by the bold lines in FIG. 22) is practically used because of the restriction C=0. Because only one value is also determined for the value a corresponding to the communication path, the combination (a, 0, 0) is determined. Note that the other two communication paths (the communication paths indicated by the broken lines in FIG. 22) are used for communication between the other nodes positioned under the leaf switch that is immediately above the node NS, and the other nodes positioned under the leaf switch that is immediately above the node NE.

Note that in the case where a half of the ports of the spine switches are used, all-to-all communication is possible with $(n+1)(n^2+n+1)$ nodes. In the case all the ports of the spine switches are used, all-to-all communication is divided into a first phase group and a second phase group. For the first phase group, a packet, turning back at the spine switch, is transmitted to a node in the layer the originating node belongs to, and for the second phase group, a packet is transmitted to a node in a layer the originating node does not belong to, not turning back at the spine switch. This enables $2(n+1)(n^2+n+1)$ nodes to perform all-to-all communication. For example, in the case where the number of ports is 36 (in other words, n=17), all-to-all communication is possible with $2 \times (17+1) \times (17^2+17+1) = 11052$ nodes.

Although an embodiment of the disclosure has been described, the disclosure is not limited to the embodiment. For example, the functional block configurations for the nodes and the switches described above may not be the same as actual program module configurations in some cases.

In addition, the data structure described above is a mere example and does not mean that data structures have to be the same as that above. Moreover, also in the procedures, it is possible to change the order of processes unless the processing result changes. Furthermore, the processing may be executed in parallel.

Figure 16:
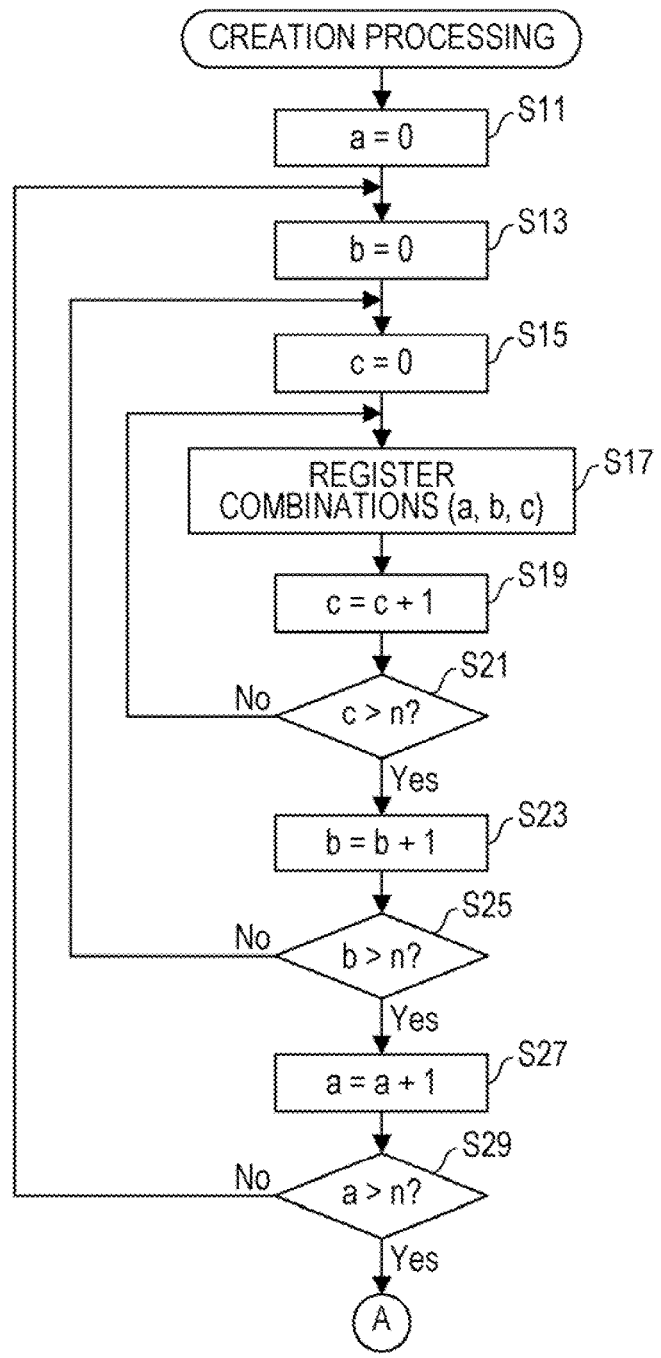
FIG. 16 is a diagram illustrating a procedure of a creation processing.
Figure 23:
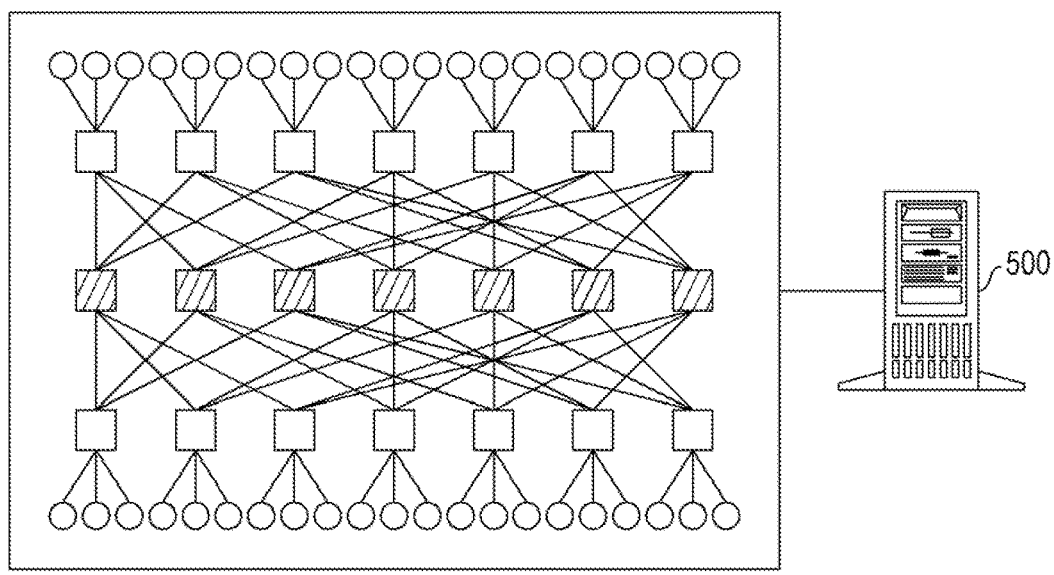
FIG. 23 is a diagram illustrating an example of a system in the case where a management apparatus is provided.

In addition, the processing described using FIGS. 15 to 17 may be executed by a management apparatus 500 separately provided as illustrated in FIG. 23 instead of being executed by a node among multiple nodes in a Latin square fat-tree network.

In addition, specified combinations (a, b, c) may be received from an administrator of a Latin square fat-tree network, instead of determining a combination (a, b, c) at the creation processing.

Figure 24:
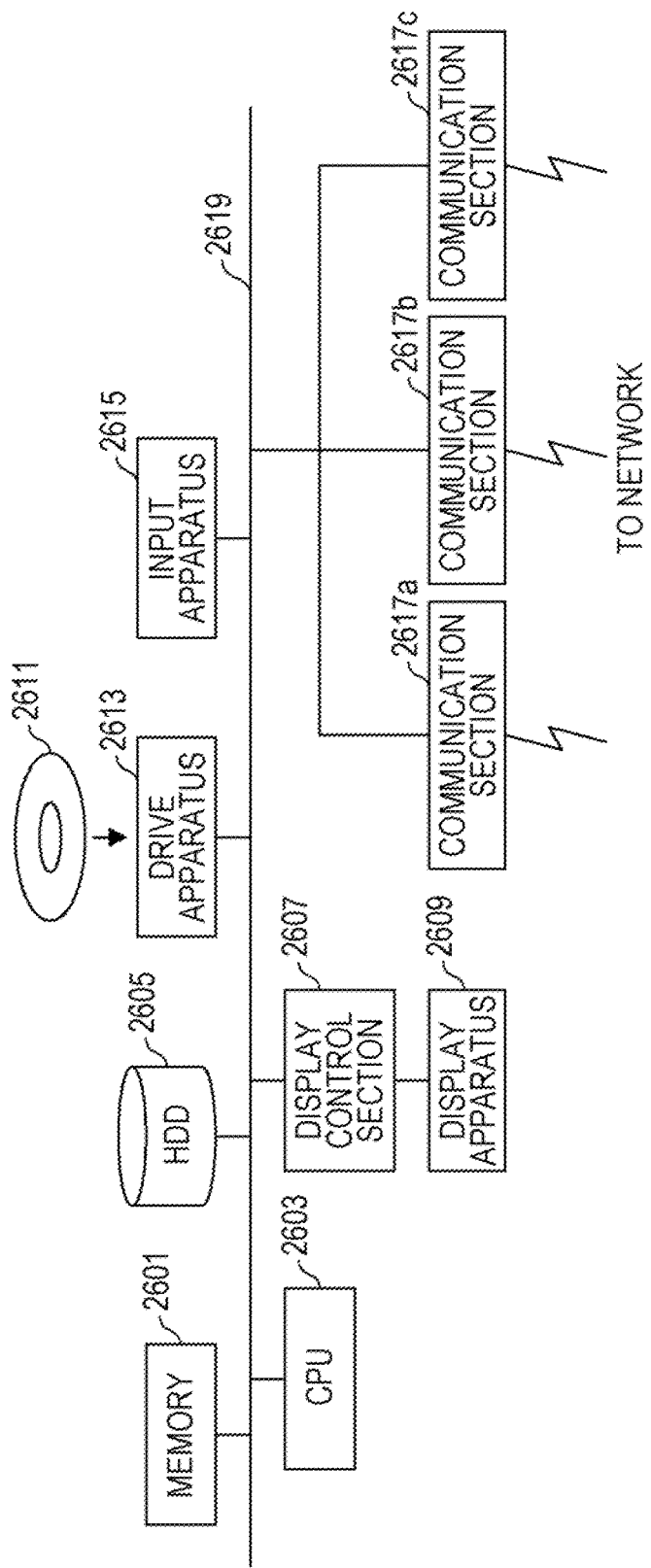
FIG. 24 is a hardware configuration diagram of the switch.

Note that the switches described above are a computer apparatus, which may include, as illustrated in FIG. 24, a memory 2601, a CPU 2603, a hard disc drive (HDD) 2605, a display control section 2607 connected to a display apparatus 2609, a drive apparatus 2613 for a removable disk 2611, an input apparatus 2615, and communication sections 2617 (2617a to 2617c in FIG. 24) for connecting to networks, which are connected via a bus 2619. Note that the display control section 2607, the display apparatus 2609, the drive apparatus 2613, and the input apparatus 2615 may not be included in some cases. An operation system (OS) and an application program to execute the processing in this embodiment are stored in the HDD 2605, and read out from the HDD 2605 into the memory 2601 for execution by the CPU 2603. The CPU 2603 controls the display control section 2607, the communication section 2617, and the drive apparatus 2613 as occasion arises to cause them to perform appropriate operation. Note that data inputted via one of the communication sections 2617 is outputted via another communication section 2617. The CPU 2603 controls the communication sections 2617 to switch an output port appropriately. Data under processing are stored in the memory 2601, and are stored in the HDD 2605 as appropriate. In the examples of the disclosure, an application program to execute the above processing is delivered being stored in the computer-readable removable disk 2611, and is installed from the drive apparatus 2613 to the HDD 2605. In some cases, the application program is installed in the HDD 2605 via a network such as the Internet, and a communication section 2617. Such a computer apparatus implements the various functions described above by organic cooperation between hardware such as the CPU 2603 and the memory 2601 described above, and the OS and the application program.

The embodiment of the disclosure described above is summarized as follows.

An information apparatus according to a first aspect of the embodiment includes: (A) an excluding section configured to exclude a combination satisfying a condition from multiple combinations each including the numbers of shifts of multiple switch layers in a Latin square fat-tree network; (B) a creating section configured to create relay settings for multiple switches for performing communication through multiple communication paths corresponding to the remaining combinations except the combination excluded from the multiple combinations; and (C) a transmission section configured to transmit correspondingly the relay settings created by the creating section to the multiple switches.

The processing above allows for communication between nodes on an appropriate communication path, making it possible to perform all-to-all communication in which all nodes participate in a Latin square fat-tree network.

The condition described above may be that the number of shifts of a switch layer to which a spine switch belongs is 0, and the number of shifts of a switch layer to which a leaf switch connected to a destination node belongs is an integer larger than 0. This excludes redundant communication paths.

In addition, the creating section described above may create, for each of the remaining combinations except the combination excluded from the multiple combinations, the relay settings for the multiple switches by determining an output port number of each switch on each of the communication paths corresponding to the combination based on the number of shifts of the switch layer to which the switch belongs. This enables each switch to relay a packet appropriately.

In addition, the number of the multiple switch layers may be 3, and the number of nodes connected to the multiple switches and the number of the multiple communication paths may be $2(n+1)(n^2+n+1)$, where n is a value obtained by subtracting 1 from a value obtained by dividing the number of ports of each of the multiple switches by 2. This makes it possible to perform the all-to-all communication in which a larger number of nodes participate.

In addition, the number of the multiple switch layers may be 2, and the number of nodes connected to the multiple switches and the number of the multiple communication paths may be $(n+1)(n^2+n+1)$, where n is a value obtained by subtracting 1 from the number of ports of each of the multiple switches. This makes it possible to perform all-to-all communication using a half of the ports of spine switches.

In addition, each of the multiple switches may output a received packet to a port with a port number corresponding to the remainder of a division in which a sum of the number of shifts and the port number of a port from which the packet has been received is divided by the number of ports of the switch.

A communication management method according to a second aspect of the embodiment includes: (D) excluding a combination satisfying a condition from multiple combinations each including numbers of shifts of multiple switch layers in a Latin square fat-tree network, (E) creating relay settings for multiple switches for performing communication through multiple communication paths corresponding to the remaining combinations except the combination excluded from the multiple combinations, and (F) transmitting correspondingly the relay settings created by the creating section to the multiple switches.

Note that it is possible to make a program for causing a computer to execute the processing according to the above method, and the program is stored in a computer readable storage medium or storage apparatus such as a flexible disk, a CD-ROM, a magneto-optical disk, a semiconductor memory, a hard disk, or the like. Note that intermediate processing results are temporarily stored in a storage apparatus such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and the processor configured to
      exclude information of a combination of port shifts of a switch satisfying a condition, from information indicating multiple combinations of port shifts of respective switches of multiple switch layers in a fat-tree network using Latin square, to cause relay port settings excluding redundant communication paths,
      create information indicating relay settings for multiple switches of the multiple switch layers for performing communication through multiple communication paths corresponding to remaining combinations except for the excluded information of the combination of port shifts of the switch, and
      transmit correspondingly the created information indicating the relay settings to the multiple switches.

2. The information processing apparatus according to claim 1, wherein
   the condition is that a number of port shifts of a switch layer among the multiple switch layers to which a spine switch belongs is 0, and a number of port shifts of a switch layer among the multiple switch layers to which a leaf switch connected to a destination node belongs is an integer larger than 0.

3. The information processing apparatus according to claim 1, wherein
   for each of the remaining combinations except the information of the combination excluded from the multiple combinations, the processor is configured to create the information indicating the relay settings for the multiple switches by determining an output port number of each switch on each of the communication paths corresponding to the combination based on a number of port shifts of each switch of a switch layer among the multiple switch layers to which each switch belongs.

4. The information processing apparatus according to claim 1, wherein
   a quantity of the multiple switch layers is 3, and the quantity of nodes connected to the multiple switches and the quantity of the multiple communication paths are $2(n+1)(n^2+n+1)$, where n is a value obtained by subtracting 1 from a value obtained by dividing the quantity of ports of each of the multiple switches by 2.

5. The information processing apparatus according to claim 1, wherein
a quantity of the multiple switch layers is 2, and
the quantity of nodes connected to the multiple switches and the quantity of the multiple communication paths are $(n+1)(n^2+n+1)$, where n is a value obtained by subtracting 1 from the quantity of ports of each of the multiple switches.

6. The information processing apparatus according to claim 1, wherein
each of the multiple switches outputs a received packet to a port with a port number corresponding to a remainder of a division in which a sum of a number of port shifts and a port number of a port from which the packet has been received is divided by a quantity of ports of each switch.

7. A communication management method of executing processing by a computer, the processing comprising:
excluding information of a combination of port shifts of a switch satisfying a condition, from information indicating multiple combinations of port shifts of respective switches of multiple switch layers in a fat-tree network using Latin square, to cause relay port settings excluding redundant communication paths;
creating information indicating relay settings for multiple switches of the multiple switch layers for performing communication through multiple communication paths corresponding to remaining combinations except for the excluded information of the combination of port shifts of the switch; and
transmitting correspondingly the created information indicating the relay settings to the multiple switches.

8. A non-transitory, computer-readable recording medium having stored therein a program for causing a computer to execute a process, the process comprising:
excluding information of a combination of port shifts of a switch satisfying a condition, from information indicating multiple combinations of port shifts of respective switches of multiple switch layers in a fat-tree network using Latin square, to cause relay port settings excluding redundant communication paths;
creating information indicating relay settings for multiple switches of the multiple switch layers for performing communication through multiple communication paths corresponding to remaining combinations except for the excluded information of the combination of port shifts of the switch; and
transmitting correspondingly the created information indicating the relay settings to multiple switches.

* * * * *